United States Patent [19]

Rubik

[11] Patent Number: 4,773,619
[45] Date of Patent: Sep. 27, 1988

[54] AIRCRAFT STRUCTURE FOR TAKE-OFF AND LANDING ON A PILOT'S FEET

[76] Inventor: Erno Rubik, Bimbo ut 210, H-1026 Budapest, Hungary

[21] Appl. No.: 6,489

[22] Filed: Jan. 23, 1987

Related U.S. Application Data

[63] Continuation-in-part of Ser. No. 638,484, filed as PCT HU83/00057 on Nov. 30, 1983, published as WO84/02115 on Jun. 7, 1984, abandoned.

[51] Int. Cl.$^4$ .............................................. B64C 3/38
[52] U.S. Cl. ...................................... 244/46; 244/48; 244/49; 244/64
[58] Field of Search ...................... 244/46, 48, 49, 64, 244/15, 22, 72

[56] References Cited

U.S. PATENT DOCUMENTS

| | | | |
|---|---|---|---|
| 544,816 | 8/1895 | Lilienthal | 244/16 |
| 1,309,961 | 7/1919 | Rippenbein | 244/46 |
| 3,270,988 | 9/1966 | Cone, Jr. | 244/199 |

Primary Examiner—Galen Barefoot
Assistant Examiner—Rodney Corl
Attorney, Agent, or Firm—Ladas & Parry

[57] ABSTRACT

The invention relates to an aircraft structure to make possible take-off and landing on a pilot's feet. The aircraft structure according to the invention can be regarded as a category between kite-shaped aircraft structures and light structures. The gist of the aircraft structure of the invention consists in providing freely supported or outerly reinforced wings (12) adapted to be moved by a pilot (15) actuated mechanism, in their own plane during flight.

9 Claims, 5 Drawing Sheets

AIRCRAFT STRUCTURE FOR TAKE-OFF AND LANDING ON A PILOT'S FEET

This application is a continuation-in-part of U.S. Ser. No. 638,484 filed as PCT HU83/00057 on Nov. 30, 1983, published as WO84/02115 on Jun. 7, 1984, now abandoned.

BACKGROUND OF THE INVENTION

The invention relates to an aircraft structure for take-off and landing on a pilot's feet. The aircraft structure of the invention can be regarded as a design between kite-shaped gliders and lightweight aircraft.

DESCRIPTION OF THE PRIOR ART

The kite-shaped aircraft structure—known also by the name hang glider, "Rogallo" or simply kite—is a widely used and popular sport structure.

One of the basic characteristics of this aircraft structure consists in the take-off and landing on a pilot's feet. The fuselage of such aircraft structure does not weigh more than 30–35 kilograms. It can be simply disassembled and assembled; the transportation in the disassembled condition is very easy. An important feature of the kite-shaped aircraft structure consists in steering by changing the position of the pilot's body. When the pilot changes his main position, the position in common of the mass center of the aircraft structure and of the pilot is also changed.

The light aircraft is another, also very popular aircraft structure. Steering members are provided in the machine of this aircraft structure, thanks to which the structure can be aerodynamically steered. The weight of the fuselage of the light aircraft is substantially higher than in the kite-shaped structure; an expedient facility of disassembly is not available to the same degree as in kite-shaped aircraft structures.

A very important disadvantage of kite-shaped aircraft structures consists in that their performance is low from the point of view of the flight; high performance or a higher degree of glide is impossible, mainly in consideration of the safety of operation of the aircraft structure. Better performance would require wider wings. Another disadvantage of kite-shaped aircraft structures consists in that the change in the position of the pilot's body during flight is limited, and in extreme cases the change involves considerable physical strain. Also, another disadvantage is possibly that there are no planar levels securing stability.

The production, stowage, and transport of the light aircraft present the disadvantage of consuming much time and space.

SUMMARY OF THE INVENTION

All disadvantages and shortcomings—virtually all of them—can be eliminated in aircraft structures of the invention, specifically in kite-shaped structures; at the same time, it is possible to maintain the advantageous features of such aircraft structures. Also, the aircraft structures of the invention incorporate several advantageous structural features of light aircraft without embodying the disadvantageous characteristics of gliders.

The object of the aircraft structures of the invention is to provide a structure which secures flight safety and substantially better flight performance as compared with known kite-shaped aircraft structures. They achieve a high degree of glide performance, accompanied by the possibility of take-off and landing on the pilot's feet.

Another object consists in ease of disassembly and ready assembly of the aircraft structure and in that the structure lends itself to be readily and inexpensively transported and stowed.

The basic concept of the invention and the means for achieving the object consist in that the mass center in common of the structure and of the pilot during flight can be changed not only by the advance of the pilot relative to the structure of the aircraft but also in that the pilot remains stationary and the wing of the aircraft is set in motion, fully or partly. In providing the possibility of such movement, a more comfortable position can be secured by the pilot in the structure; the actuation of the mechanism does not involve for the pilot particular physical strain; no special force exertion is necessary for moving the wings if the members of the structure are suitably selected; also, there is less exertion in a comfortable position of the body.

The wing movement takes place in its own planar level, but it is quite possible for the wing to carry out a complex movement, which, in addition to the movement carried out in its own planar level, represents a twist-like movement component.

A further object of this invention relates to the wing moving mechanism, wherein the wings in addition to the movement carried out in their own planar level—releasing the uprise or sinking of the aircraft structure—are turnable around the axis falling in direction of the wing length with the purpose to release the turning operation of the aircraft structure.

Accordingly, it can be said in regard to the movement of the wing as to the direction of the movement that the wing can be moved mainly in its own planar level. It is expedient if the wing, in the horizontal flight direction, rotates relative to a vertically positioned axis or pivot or thereabout. One can speak of a solution where not a wing in its entirety is set in motion, but only a part of the wing oriented in the longitudinal direction. In such structures the moving part of the wing is not movably connected with the aforementioned axis or pivot.

In an advantageous embodiment of the invention, the ends of the wings are split in a manner known per se. The split can reduce the induced resistance, and the result is that of better flight performance. Generally, the split improves the flight characteristics of the machine; to the aircraft structure is imparted stability in the transverse direction, thus increasing the flight safety.

Another basic structural feature of the aircraft structure consists in the presence of a horizontal damping plane. This damping plane can lie in the area necessary for the stay of the pilot during flight. If the said horizontal damping plane lies in front of the pilot's area, the same should be so arranged that the pilot's vision is essentially not obstructed or limited. The horizontal damping plane assures the stability of the aircraft structure in the longitudinal direction, thus making unnecessary the twist of the wing.

Another basic structural feature of the aircraft structure of the invention consists in a vertical damping plane. The vertical damping plane provides the stability of the aircraft in the side direction. It is possible to set in motion the vertical damping plane, such movement being carried out by a pilot-actuated mechanism or a motor. It should be pointed out that the force required for such movement is very slight. The vertical damping plane is set in motion around an axis in the vertical plane of symmetry of the aircraft structure or in the axis of a plane parallel thereto, namely, so that the vertical damping plane carries out a pendulum-like movement around the said axis. The described movement of the vertical damping axis can generate an aerodynamic force falling in the direction of flight, and such force by reducing the resistance to the flight would actually increase the glide of the aircraft structure, i.e., the flight performance.

In the aircraft structure of the invention, the horizontal and vertical damping planes can be used separately, but an embodiment is considered to be particularly advantageous incorporating both the movable wing and the horizontal damping plane and the vertical damping plane.

The pilot can take the most comfortable stretched sitting position during the flight; the pilot's area can also be partly covered. The pilot's seat should have a belt, and between the take-off and landing and during flight, the seat should follow the body, such that it is detachably fastened in the flight position. For such purpose, the seat structure is expediently so arranged that it resembles a knapsack with a tubular frame. This seat structure must be pivotably connected to the suspension place behind the pilot, and in the pilot's position during the flight, it should be fastened on the side or on the lower part of the pilot's area by means of a detachable connection.

The aircraft structure of the invention can provide the use of one or several accessories to increase the safety or comfort during flight, or to facilitate take-off and landing or to provide a higher degree of safety. For example, a wheel or a flexible rotatable element can be disposed below the pilot's area in the aircraft structure, and possibly the aircraft structure can be lowered without it being necessary for the pilot to change the body position during flight into the usual landing position of the body. Likewise, for reasons of safety, a flexible element can be built into the nose of the aircraft.

In the aircraft structure of the invention, the wing and the possibly applied damping planes are flexibly constructed. The configuration of the wing, like in known kite-shaped aircraft structures, is determined by aerodynamic forces. It should be noted that in aircraft structures of the invention there are no movable steering planes. There is no transverse rudder on the wings, the damping planes have no movable steering areas.

Therefore, the gist in a basic version of the aircraft structure of the invention consists in that the aircraft is provided with freely supported or to the utmost spreadable wings, movable in their own plane by the pilot-actuated mechanism and with a horizontal damping plane before or behind the pilot's area.

The gist of another basic embodiment of the aircraft structure of the invention consists in that the aircraft is provided with a freely supported or to the utmost spreading wings movable in their own plane by the pilot-actuated mechanism, particularly in their own plane, and a vertical damping plane.

From the last-mentioned embodiment is derived a structure consisting in that a horizontal damping plane is provided in front of or behind the pilot's area, and the construction has a vertical damping plane.

In a further embodiment of the proposed solution, only one part of each wing can be set in motion.

In another advantageous embodiment of the invention, the wings during horizontal flight are rotatably attached on a pivot or an axis in a substantially vertical position.

In another embodiment, the ends of the wings are split.

An extremely expedient solution is achieved by providing a seat strapped to the pilot, which during contact with ground and in flight is adjustable into a position corresponding to the pilot's body position and can be detachably mounted in such position.

The gist of another embodiment consists in that the vertical damping plane is attached to the axis extending in the vertical plane of symmetry or in the axis extending parallel thereto of the aircraft structure, and in providing a mechanism swinging the vertical damping plane around the axis. The vertical damping plane can be set in motion by a pilot-actuated mechanism, and also a motor can be used for such purpose.

BRIEF DESCRIPTION OF THE DRAWINGS

The invention will be explained on the basis of several advantageous embodiments with accompanying drawings; a general example of known kite-shaped aircraft structures is also illustrated.

In the drawings.

DESCRIPTION OF THE PREFERRED EMBODIMENT

Figure 1:
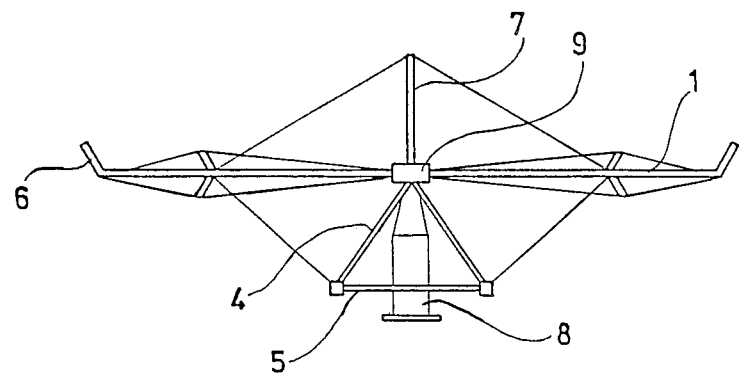
FIG. 1 is the front view of a typical example of a known kite-shaped aircraft structure.
Figure 2:
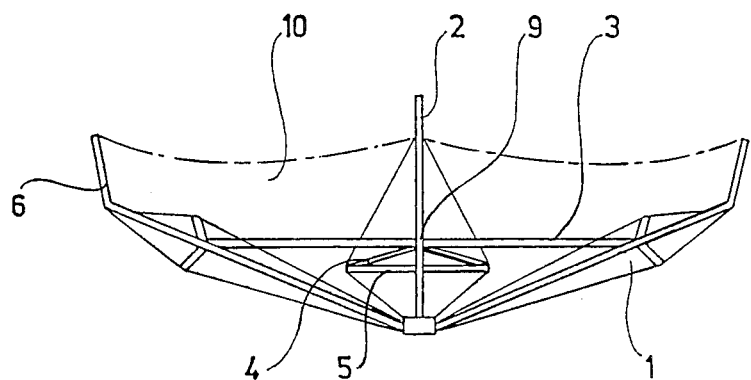
FIG. 2 is a plan view of the aircraft structure according to FIG. 1.

As can well be seen in FIGS. 1 and 2, the kite-shaped aircraft structure, in the illustrated typical embodiment, is an extremely simple structure. The framework actually consists of four tubes, generally of light material; on the same are spanned canvas-like pieces, which during flight by the action of air forces assume a shape which imparts to the subunits of an aircraft structure (which can be called wing units) a cross section or a profile generating a thrust force. It is clearly seen in the said figures that the transverse support 3 attached to the main support 1, as well as the stem 2, seem to determine the central plane of the aircraft structure wherein mast 7 stands vertical relative to the said plane. Mast 7 with the transverse support 3 and stem 2 coincide at junction point 9. Wing end supports 6 are shaped at the ends of the main support 1.

Various reinforcing parts are provided for the described tubular structure; such parts are shown in FIGS. 1 and 2, and a special explanation of their function is not necessary. To the juncture point 9 are attached the suspension frames 4 with the steering rod 5 and the tiltingly designed seat 8. A cover 10 is a spanned canvas which by the action of air assumes the shape generating the thrust force.

It is clear from the description of the characteristic embodiment of the kite-shaped aircraft structure that together with its simplicity the structure provides a very uncomfortable position for the pilot and a possibly heavy load, without any member necessary for imparting stability. Practical experience has shown that the slidability of the aircraft structure if quite unfavorable.

Figure 3:
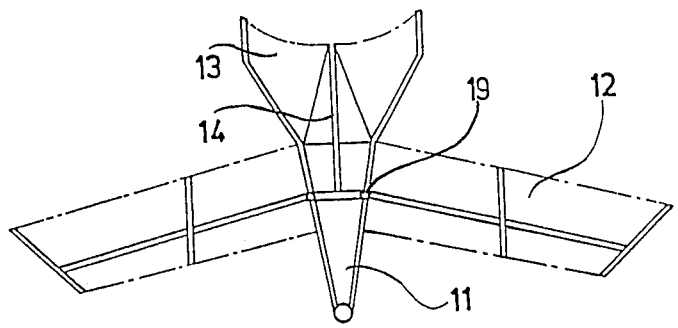
FIG. 3 is a plan view of an embodiment of the aircraft structure of the invention.
Figure 4:
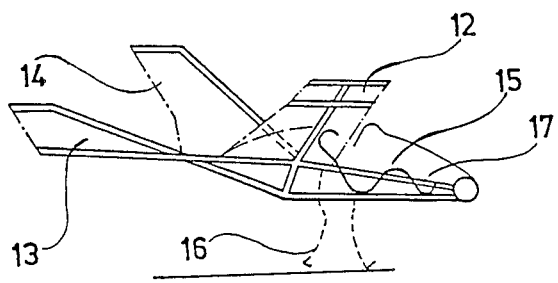
FIG. 4 is a side view of the aircraft structure of FIG. 3.
Figure 5:
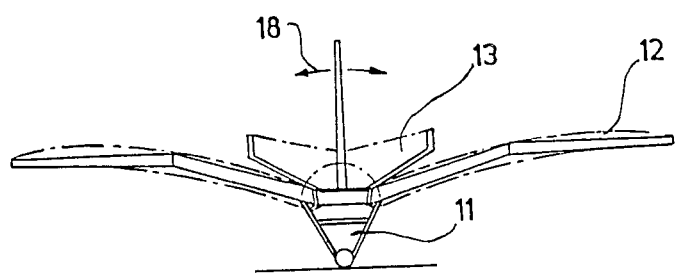
FIG. 5 is a front view of the aircraft structure of FIGS. 3 and 4.

FIGS. 3 and 5 show embodiments of the aircraft structure of the invention which in addition to the movable wing 12 have a horizontal damping plane 13 and a vertical damping plane 14. In this embodiment, the wings 12 are freely supported and there in no outer reinforcement. The pilot sitting in the pilot area, due to a mechanism for such purpose, can set the wings in motion. The mechanism is not illustrated in FIGS. 3 to 8, characterizing a general solution, since it is within the realm of the designer and can assume various forms as dictated by need. Some details are given in FIG. 9.

According to the invention, the wing is constructed that it moves mainly in its own plane while also a movement component of a different direction or deflecting nature can also exist, such that, for example, there is a slight twist of the wing 12. In the most simple design—as indicated by FIG. 3—it is expedient to rotatably mount the wing 12 around the axis substantially vertical to the plane of the drawing or around a pivot 19. A solution is also possible where both wings 12 are moved at the same time, or a mechanism can be used which provides the separate movement of each wing 12. There can be such structure that both wings can be rotated around an axis or a pivot 19.

Figure 9:
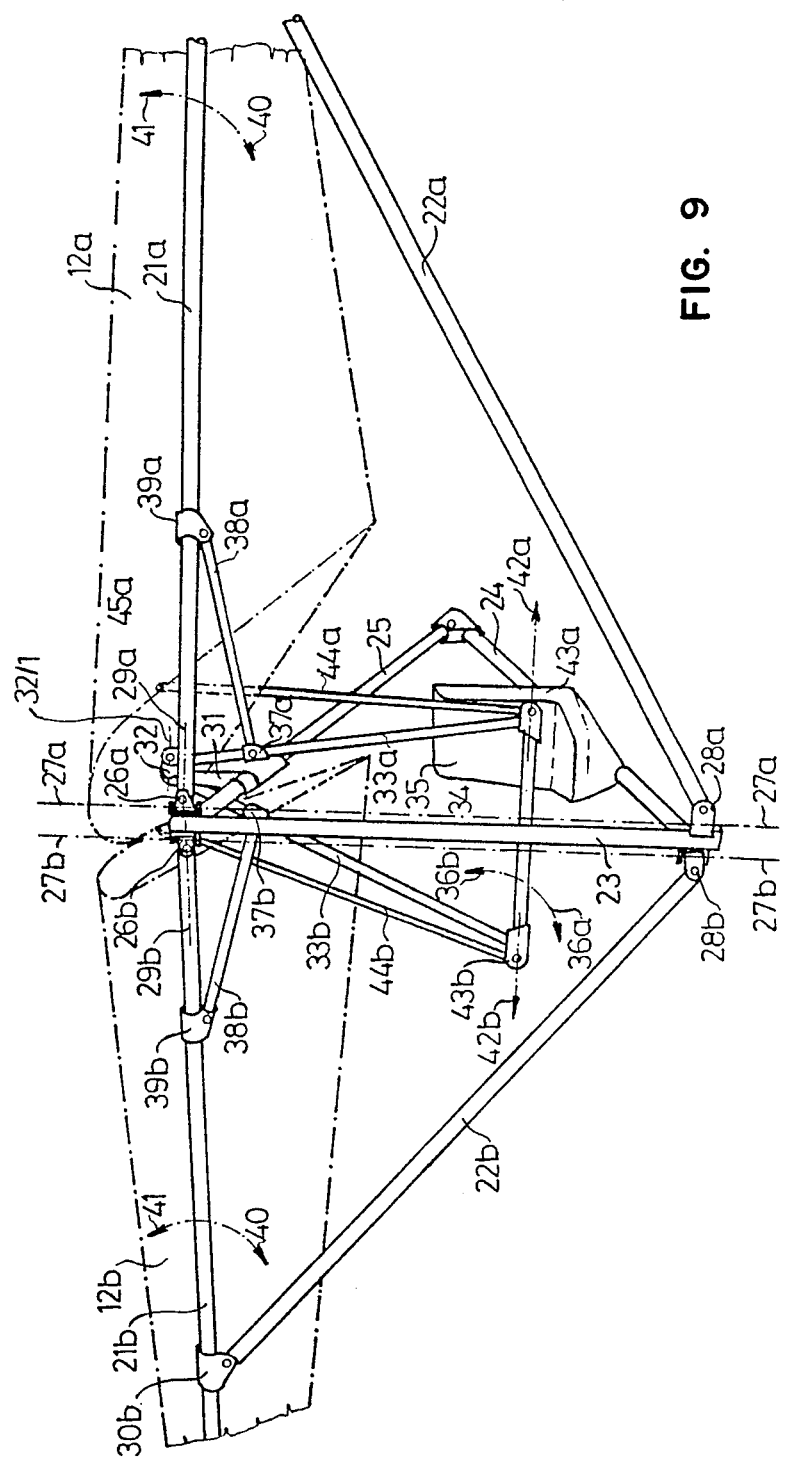
FIG. 9 gives the axonometric detailed view of the embodiment of the wing moving mechanism serving as example.

Relating to a given embodiment, the mechanism moving the wings is to be seen in the axonometric FIG. 9. In order to facilitate presentation of the given embodiment, the wings 12a, 12b are not illustrated as self-carrying units; the main spars 21a, 21b are supported by the rods 22a, 22b. The motion of the main spars 21a, 21b is identical with the motion of the wings 12a, 12b.

The rods 23, 24, 25 are forming a part of the frame of the aircraft structure. In the rigid connection point of the rods 23 and 25 the universal joints 26a, 26b are arranged, enabling the rotation of the main spars 21a, 21b around the axes of rotation 27a, 27b in cooperation with the pivots 28a, 28b in the rigid connection point of the rods 23 and 24. (These axes of rotation are identical with the pivot 19 in FIG. 3).

The universal joints 26a, 26b enable furtheron turn of the main spars 21a, 21b in direction of the longitudinal axes 29a, 29b; to achieve axial turning of the main spars, engagement with the supporting rods 22a, 22b is realized with the cleavises 30a, 30b, while this way of engagement enables turning of the main spars within the celvis. (The clevis 30a is not illustrated here.)

The trestle 31 as a rigid support is arranged on the frame-rod 25 in such a manner that the trestle is able to turn on the rod but fixed in the longitudinal direction of the rod. The pivoting construction of the trestle on the rod 25 is similar as the construction shown in FIG. 10. The rigid steering triangle consisting of the rods 33a, 33b, 34—clasped by the pilot's hand—is suspended on the pin 32 of the trestles.

If the pilot is pushing forward said steering triangle in direction 36a, the steering triangle will turn around the axis 32/1 of the pin 32; thereby the pivots 37a, 37b on the rods 33a, 33b are moving also forward, which again are displacing the pivots 39a, 39b by the intervention of the rods 38a, 38b. The pivots 39a, 39b are fixed on the main spars 21a, 21b in the longitudinal directions (but the main spars are turnable in the pivots 39a, 39b around the longitudinal axes 29a, 29b) in such a manner that the main wing spars are also moving forwards (direction 40) by turning around the axes of rotation 27a, 27b.

Figure 10:
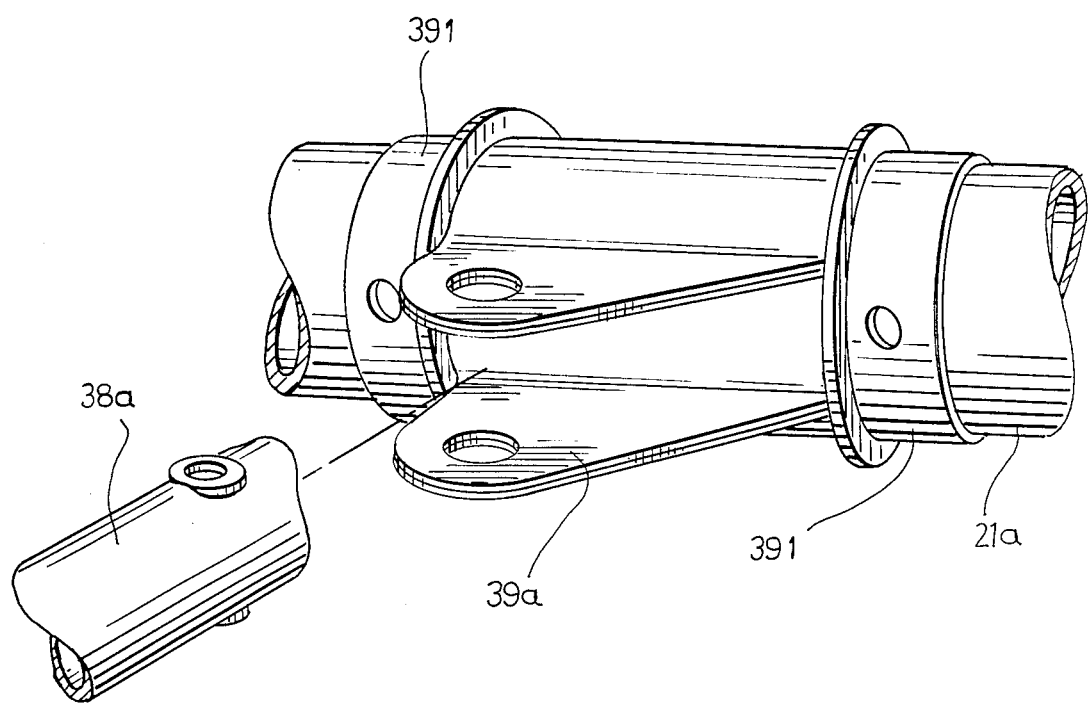
FIG. 10 is a front view of a possible embodiment of the main spar pivots.

A given embodiment of the pivots 39a, 39b is shown in FIG. 10. According to FIG. 10, the main wing spar 21a is turnable in the pivot 39a, but the position of 39a in the longitudinal direction of the main spar 21a is fixed by means of the flanges 391.

As a final result, by pushing forward the rod 34 of the steering triangle, the wings are pushed forward in their own planar level, around the axes 27a, 27b in direction 40, which represents—as a matter of fact—the means according to the invention for changing the flying altitude of the kite-shaped structure.

In an analogous way, by pulling the rod 34 of the steering triangle backwards, in direction 36b, the wings turning around the axes 27a, 27b are moved backwards in direction 41, in their own planar level.

Now, if the pilot displaces the steering triangle, e.g., the rod 34 in its longitudinal direction, e.g., in direction 42a, the steering triangle will be turned on the carrier rod 25 by the intervention of the trestle 31. The rod 44a having been coupled to the pin 43a of the steering triangle is moving upwards, while the rod 44b coupled to the pin 43b is moving downwards. The rod 44a displaces the pin 45a on the wing 12a and the pin 45b on the wing 12b (being covered in the figure, accordingly it is invisible), whereby the wing 12a is turning around its own axis 29a in one direction, while the wing 12b is turning around the axis 29b in the opposite direction.

By displacing the steering triangle in direction 42b an analogous effect can be released, however, in an opposed sense, as detailed above.

As a final result, by displacing the steering triangle in direction 42a, 42b, the wings are turned around their longitudinal axis, namely one wing is turned in one direction, the other wing is the opposite direction, releasing the control of tilting or turning of the aircraft structure in accordance with the invention.

It is well seen in the figures that the pilot during take-off and landing is in a position 16 known as the "position of run", while during the actual flight, he assumes the flight position 17. Flight position 17 is a sitting position in which the pilot 15 can comfortably stretch and with slight exertion can carry out wing movements determining the steering without it being necessary that he change his position.

The pilot are 11 is partly closed; it can be provided with a streamlined outer canopy; such design is aerodynamically extremely advantageous. In the here discussed embodiment, the horizontal damping plane is disposed behind the pilot area 11.

As already mentioned in the general description of the aircraft structure of the invention, a solution is possible where the vertical damping plane 14 is set into a pendulum movement. In this embodiment the movement of the vertical damping plane 14, basing this on FIG. 5, takes place around the axis perpendicular to the plane of the drawing, according to arrow 18. The vertical damping plane 14 can be set in motion by the pilot's muscular force, by using a mechanism (not shown); the pendulum movement of the vertical damping plane can also be motor actuated.

Figure 6:
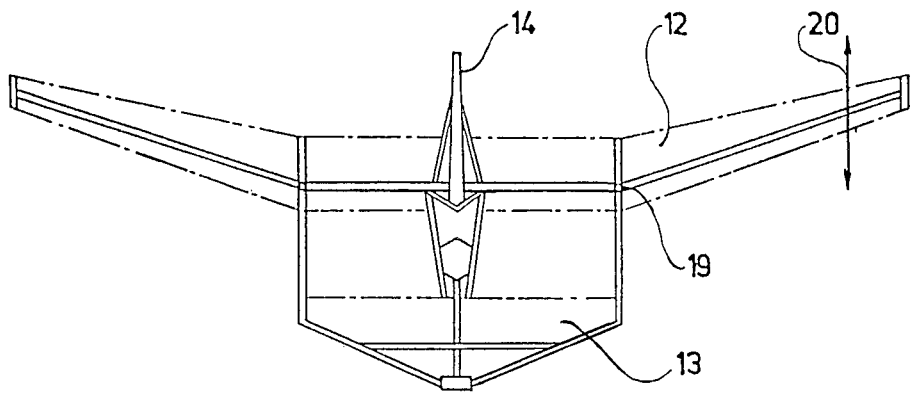
FIG. 6 is a plan view of another possible embodiment of the aircraft structure of the invention.
Figure 8:
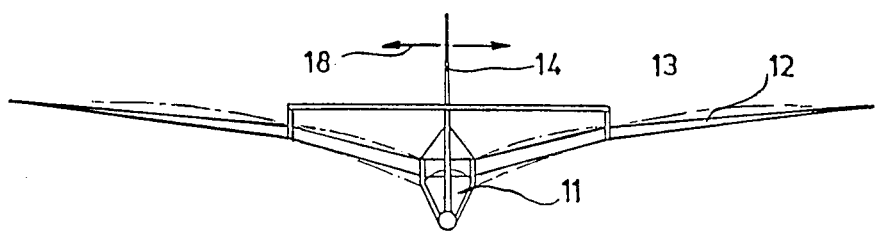
FIG. 8 is a front view of the aircraft structure of FIGS. 6 and 7.

The embodiment of FIGS. 6 and 8 differs from the embodiment of FIGS. 3 to 5, in that the horizontal damping plane 13 is disposed in front of the pilot's area 11 and the wing 12 is not moved in its entirety, but only the outer part of the wing is moved around the pivot 19 according to arrow 20. The other members have substantially the same structure as in the earlier described embodiment.

As follows from FIG. 7, the damping plane 13 is so disposed or mounted that the pilot's vision is only insignificantly disturbed.

The specification of the aircraft structure of the invention does not describe in detail the framework nor the thrust-securing canvas or other similar members, since there parts are beyond the scope of the invention and are generally known.

Figure 7:
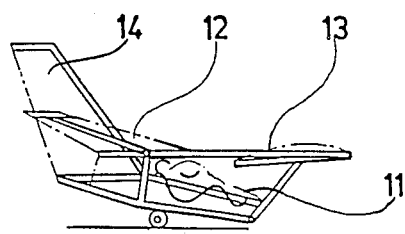
FIG. 7 is a side view of the aircraft structure of FIG. 6.

It will be understood from FIGS. 4 and 7 that the lower part of the pilot's area 11 is so constructed that take-off and landing is possible on the feet. The seat should be accordingly constructed to be movably mounted; the pilot is strapped into the seat, and the seat is supported by a member disposed over the head of the pilot or at the level of the head or close thereto. The seat structure is adapted to be strapped and has a frame similar to that of the knapsacks with a tubular frame and is provided with members which engage the articles present in the pilot's area 11 if the pilot 15 is in flight position 17. The said engaging members provide the firm position of the seat. On landing or in case of peril, when the pilot intends to set aside flight position 17, with a single movement he can release the fastening of the seat to reach the run position 16 shown in FIGS. 4 and 7.

There should still be mentioned another advantageous embodiment of the aircraft structure of the invention, a rolling element or a flexible member is disposed below the pilot's area 11 to make possible landing and take-off such that during take-off and landing the pilot 15 can maintain flight position 17.

A solution can be realized for reasons of safety where a flexible body, for example, a spongelike body, is incorporated in the nose part of the aircraft structure.

As can be seen from the description of the invention, the aircraft structure is extremely simple, the weight is low, in disassembled condition the structure can be readily carried and transported, for example, in the trunk of a motor vehicle. Any additional parts can by simply and readily assembled in the aircraft at the place of take-off. As compared with aircraft structures of the same catagory, the said many advantages are of significant import, both from the point of view of safety of flight as of flight performance. In addition to the said advantages, neither the steering of the aircraft structure nor the maneuvering connected with the steering entails any special physical strain or any burden for the pilot, and the aircraft structure makes it possible for him to remain a longer time airborne. It should still be mentioned that the embodiment of the aircraft structure of the invention does not involve any difficulties in the selection of spots for landing.

I claim:

1. An aircraft structure adapted for take-off and landing on a pilot's feet, comprising a light-weight frame of rigid construction having a pilot's area with a pilot actuated mechanism, and a pair of light-weight wings, said pilot actuated mechanism including a planar steering assembly adapted to be moved by the pilot, said mechanism suspended on a pin connected to the frame construction and movable perpendicularly to the plane of said assembly by the intervention of rods interconnecting said frame to said pair of light weight wings, said wings mounted for a first movement in the plane of said wings around a first pivot axis perpendicular to the plane of the wings, said first pivot axis formed by means of universal joints coupled to the frame, said first wing movement being actuated by movement of said steering assembly perpendicular to its plane whereby said wings are moved in flight principally in the plane of said wings, said aircraft structure further comprising means mounting the wings for a second wing movement around a second axis extending along the longitudinal direction of the wings, said second wing movement being actuated by the displacement of the steering assembly in the plane of the steering assembly, whereby said second wing movement is accomplished in a selected direction by turning said steering assembly on a bearing on the frame construction and by means of said connecting rods between the wings and the steering assembly and in such a manner that one wing and the other wing are movable in opposite directions.

2. The aircraft structure as claimed in claim 1, wherein the planar steering assembly is a triangle-rod assembly.

3. The aircraft structure according to claim 1, including means providing a horizontal damping plane disposed adjacent the pilot's area.

4. The aircraft structure according to claim 1, including means providing a vertical damping plane.

5. The aircraft structure according to claim 1 or 2, wherein only one part of each individual wing is adapted to be moved.

6. The aircraft structure according to claim 1 or 2, wherein the wings are rotatably mounted for movement about a substantially vertical pivot axis during horizontal flight.

7. The aircraft structure according to claim 1 and 2, wherein the ends of the wings are split.

8. The aircraft structure according to claim 4, wherein the aircraft has a vertical plane symmetry and the vertical damping plane is parallel to the vertical plane of symmetry of the aircraft structure, and includes a mechanism permitting pivotable movement around the axis of the vertical damping plane.

9. The aircraft structure according to claim 8, including a motor to enable movement of the vertical damping plane around an axis perpendicular to the vertical damping plane.

* * * * *